United States Patent
Asano (10) Patent No.: US 9,816,829 B2
(45) Date of Patent: Nov. 14, 2017

(54) IN-VEHICLE NAVIGATION APPARATUS

(71) Applicant: Alpine Electronics, Inc., Tokyo (JP)

(72) Inventor: Michinao Asano, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 232 days.

(21) Appl. No.: 14/071,861

(22) Filed: Nov. 5, 2013

(65) Prior Publication Data

US 2014/0163878 A1    Jun. 12, 2014

(30) Foreign Application Priority Data

Dec. 11, 2012  (JP) .................................. 2012-270808

(51) Int. Cl.
*G01C 21/36*    (2006.01)

(52) U.S. Cl.
CPC ..... *G01C 21/3658* (2013.01); *G01C 21/3655* (2013.01)

(58) Field of Classification Search
None
See application file for complete search history.

(56) References Cited

U.S. PATENT DOCUMENTS 5,908,465 A * 6/1999 Ito ..................... G01C 21/3614
340/995.27
2001/0049582 A1 * 12/2001 Sakashita ........... G01C 21/3658
701/437
2007/0106459 A1 * 5/2007 Nakayama ......... G01C 21/3655
701/533
2007/0106470 A1 * 5/2007 Nakayama ......... G01C 21/3629
701/437

(Continued)

FOREIGN PATENT DOCUMENTS

| JP | 2004-340826 | 12/2004 |
| JP | 2005-37329 | 2/2005 |
| JP | 2007-127598 | 5/2007 |

(Continued)

OTHER PUBLICATIONS

First Office Action for Japanese Patent Application No. 2012-270808 dated May 25, 2016, 9 pgs. including English translation.

(Continued)

*Primary Examiner* — Todd Melton
*Assistant Examiner* — Jason Roberson
(74) *Attorney, Agent, or Firm* — Brinks Gilson & Lione (57) ABSTRACT

An in-vehicle navigation apparatus that provides guidance to a lane on which a user's vehicle should travel, among driving lanes on a route, includes a landmark information acquiring unit and a lane guide unit. The landmark information acquiring unit acquires landmark information representing an object which serves as a landmark existing along the route within a landmark acquisition range that is set between a certain point on a near side of a specific point and the specific point. The lane on which the user's vehicle should travel on the route is restricted at the specific point. The lane guide unit provides guidance to the lane on which the user's vehicle should travel in association with the object represented by the landmark information acquired by the landmark information acquiring unit.

12 Claims, 9 Drawing Sheets

(56) References Cited

U.S. PATENT DOCUMENTS

2008/0288163 A1 11/2008 Asano
2009/0201176 A1* 8/2009 Shimada ................ G01C 21/20
340/944

FOREIGN PATENT DOCUMENTS

| JP | 2008-286671 | 11/2008 |
|---|---|---|
| JP | 2010-15254 | 1/2010 |
| JP | 2010-107462 | 5/2010 |
| JP | 2011-174723 | 9/2011 |
| JP | 2012-037455 | 2/2012 |

OTHER PUBLICATIONS

Office Action for JP2012-270808 dated Dec. 28, 2016, 6 pgs. Including English translation.

* cited by examiner

IN-VEHICLE NAVIGATION APPARATUS

RELATED APPLICATION

The present application claims priority to Japanese Patent Application Number 2012-270808, filed Dec. 11, 2012, the entirety of which is hereby incorporated by reference.

BACKGROUND

1. Field of the Invention

The present invention relates to an in-vehicle navigation apparatus that provides guidance to a lane on which a user's vehicle should travel on a guidance route which the vehicle should follow.

2. Description of the Related Art

A navigation apparatus in related art is described in Japanese Unexamined Patent Application Publication No. 2004-340826. The navigation apparatus displays, on a display unit, information about lanes at each of multiple intersections within a certain distance (for example, within 500 m) from the current position of the vehicle, regardless of guided intersections where route guidance, such as right turn or left turn, is performed or unguided intersections where no route guidance is performed. Since a guided lane is displayed, for example, in a color different from the colors of the other lanes regardless of the guided intersections or the unguided intersection in the display of the information about the lanes at each intersection, a user who watches the display in the display unit is capable of knowing the status of the lanes not only at guided intersections but also at unguided intersections. In addition, the user is capable of appropriately understanding which lane the vehicle should travel on toward a guided intersection.

Since the lane on which the vehicle should travel is displayed in a color different than other lanes in the navigation apparatus described in Japanese Unexamined Patent Application Publication No. 2004-340826, the user is capable of appropriately understanding the lane on which the vehicle should travel. However, for example, when the route guidance is to turn left at a guided intersection in a case in which a left-turn lane and a through lane are provided at an unguided intersection closest to the current position of the user's vehicle, and a left-turn lane, a through-lane, and a right-turn lane are provided at the guided intersection following the unguided intersection, the vehicle that travels in the left-turn lane too early may be forced to turn left at the unguided intersection, which is before the guided intersection existing on the route that is set. In other words, even if the lane on which the vehicle should travel is displayed in a color different than other lanes, it may be difficult for the user to determine a time when the vehicle should change to the lane on which the vehicle should run before passing through various intersections.

SUMMARY

Accordingly, it is an object of embodiments of the present invention to provide an in-vehicle navigation apparatus capable of guiding a user to a lane on which the user's vehicle should travel so that the user can easily understand a time when the user's vehicle should change to the lane on which the user's vehicle should travel when the vehicle is traveling on a guidance route that is set.

According to an embodiment of the present invention, an in-vehicle navigation apparatus that provides guidance to a lane on which a user's vehicle should travel, among driving lanes on a guidance route, includes a landmark information acquiring unit and a lane guide unit. The landmark information acquiring unit acquires landmark information representing an object which serves as a landmark existing along the route within a landmark acquisition range that is set between a certain point on a near side of a specific point and the specific point. The lane on which the user's vehicle should travel on the route is restricted at the specific point. The lane guide unit provides guidance to the lane on which the user's vehicle should travel in association with the object represented by the landmark information acquired by the landmark information acquiring unit.

With the above configuration, landmark information is acquired which represents an object serving as a landmark existing along the route within the landmark acquisition range set between the certain point on the near side of the specific point and the specific point. The lane on which the user's vehicle receiving the guidance should travel is restricted at the specific point. The lane on which the user's vehicle should travel is guided in association with the object represented by the landmark information. Accordingly, a driver receiving the guidance is capable of performing a driving operation to change the lane on which the user's vehicle is traveling to the guided lane by using the confirmation of the object existing along the route as a trigger when the user's vehicle is traveling to the specific point.

The specific point at which the lane on which the user's vehicle should travel is restricted is a point where the driving lanes are restricted to possibly require a lane change on the near side of the point and includes a point where the number of lanes is reduced because of an intersection or the reduction in the width of the road.

The landmark information acquiring unit may selectively acquire the landmark information from landmark information (the information representing objects serving as landmarks) stored in advance in a storage unit in association with the directions at each specific point, such as an intersection, or may acquire the landmark information on the basis of the result of a search of map information (including facility information representing information about facilities and positional information about the facilities). In the latter case, in the in-vehicle navigation apparatus according to an embodiment of the present invention, the landmark information acquiring unit may include a landmark search unit that searches for an object existing along the route within the landmark acquisition range, and the landmark information acquiring unit may acquire the landmark information representing the object resulting from the search by the landmark search unit.

With the above configuration, an object existing along the route within the landmark acquisition range set between the certain point on the near side of the specific point and the specific point where the lane on which the user's vehicle receiving the route guidance should travel is restricted is searched for from the map information or the like to acquire the landmark information representing the object resulting from the search.

In the in-vehicle navigation apparatus, when landmark information representing multiple objects is acquired in the search by the landmark search unit, the landmark information acquiring unit may acquire the landmark information representing any of the multiple objects.

With the above configuration, the landmark information representing any of the multiple objects resulting from the search within the landmark acquisition range is acquired and the lane on which the user's vehicle should travel is guided in association with the object represented by the landmark information.

In the in-vehicle navigation apparatus, the landmark information acquiring unit may acquire the landmark information representing an object most distant from the specific point, among the multiple objects.

With the above configuration, the lane on which the user's vehicle should travel is guided in association with the object most distant from the specific point, among the multiple objects resulting from the search within the landmark acquisition range. Accordingly, a driver receiving the guidance is capable of performing the driving operation to change to the guided lane in plenty of time by using the confirmation of the object existing along the route as a trigger when the user's vehicle is traveling to the specific point.

In the in-vehicle navigation apparatus, the landmark acquisition range may be set so as to be spaced apart from the specific point with an increasing speed limit on the route to the specific point.

With the above configuration, the lane on which the user's vehicle should travel is guided in association with the object existing along the route within the landmark acquisition range set so as to be spaced apart from the specific point with an increasing speed limit on the route to the specific point. Accordingly, a driver receiving the guidance is capable of appropriately performing the driving operation to change to the guided lane by using the confirmation of the object existing along the route as a trigger even if the driving speed of the user's vehicle increases with the speed limit when the user's vehicle is traveling to the specific point.

In the in-vehicle navigation apparatus, the landmark acquisition range may be set so as to be spaced apart from the specific point with increasing driving speed of the user's vehicle at the certain point on the near side of the specific point.

With the above configuration, the lane on which the user's vehicle should travel is guided in association with the object existing along the route within the landmark acquisition range set so as to be spaced apart from the specific point with increasing driving speed of the user's vehicle at the certain point on the near side of the specific point. Accordingly, a driver receiving the guidance is capable of appropriately performing the driving operation to change to the guided lane by using the confirmation of the object existing along the route as a trigger even if the driving speed of the user's vehicle is increased when the user's vehicle is traveling to the specific point.

In the in-vehicle navigation apparatus, the lane guide unit may guide travel on a specific lane by using the object represented by the landmark information acquired by the landmark information acquiring unit as a trigger.

With the above configuration, since the guidance to travel on a specific lane is made by using the object represented by the landmark information acquired within the landmark acquisition range as a trigger when the user's vehicle is traveling to the specific point, a driver receiving the guidance is capable of performing the driving operation to change the lane on which the user's vehicle is traveling to the guided specific lane by using the confirmation of the object existing along the route as a trigger.

In the in-vehicle navigation apparatus, the lane guide unit may guide travel on the specific lane after the user's vehicle passes the object represented by the landmark information.

With the above configuration, since the guidance to travel on the specific lane is made after the user's vehicle passes the object represented by the landmark information acquired within the landmark acquisition range when the user's vehicle is traveling to the specific point, the driver receiving the guidance is capable of performing the driving operation to change the lane on which the user's vehicle is traveling to the guided specific lane by using the confirmation of passing the object existing along the route as a trigger.

In the in-vehicle navigation apparatus, the lane guide unit may include a landmark display control unit and a lane guidance display control unit. The landmark display control unit displays a mark corresponding to the object represented by the landmark information on a map that includes the guidance route and is displayed on a display unit. The lane guidance display control unit displays lane guidance information leading the user's vehicle to the specific lane on which the user's vehicle should travel in association with the mark displayed on the display unit.

With the above configuration, the mark corresponding to the object serving as the landmark and the lane guidance information leading the user's vehicle to the specific lane on which the user's vehicle should travel are displayed on the map including the guidance route on the display unit when the user's vehicle is traveling to the specific point. A driver who confirms the mark and the lane guidance information displayed on the map including the traveling route, displayed on the display unit, is capable of performing the driving operation to change to the specific lane represented by the lane guidance information by using the confirmation of the object represented by the mark as a trigger.

In the in-vehicle navigation apparatus, the landmark information acquiring unit may acquire the landmark information representing the object existing along the lane on which the user's vehicle is traveling.

With the above configuration, since the object existing along the lane on which the user's vehicle is traveling serves as the landmark, a driver driving the user's vehicle is capable of relatively easily finding the object on the route.

In the in-vehicle navigation apparatus, the landmark information acquiring unit may acquire the landmark information representing a facility existing along the route on which the user's vehicle is traveling.

The object serving as the landmark is not specially limited as long as the object exists along the route. The object may be, for example, a sign, an advertising sign, or a facility.

According to the in-vehicle navigation apparatus according to an embodiment of the present invention, a driver receiving guidance of the lane on which the user's vehicle should travel is capable of performing the driving operation to change the lane on which the user's vehicle is traveling to the guided lane by using the confirmation of an object existing along the route as a trigger when the user's vehicle is traveling to the specific point. Accordingly, the driver is capable of easily understanding the time when the user's vehicle should change the lane with reference to the object.

DESCRIPTION OF THE PREFERRED EMBODIMENTS

Embodiments of the present invention will be described with reference to the attached drawings.

Figure 1:
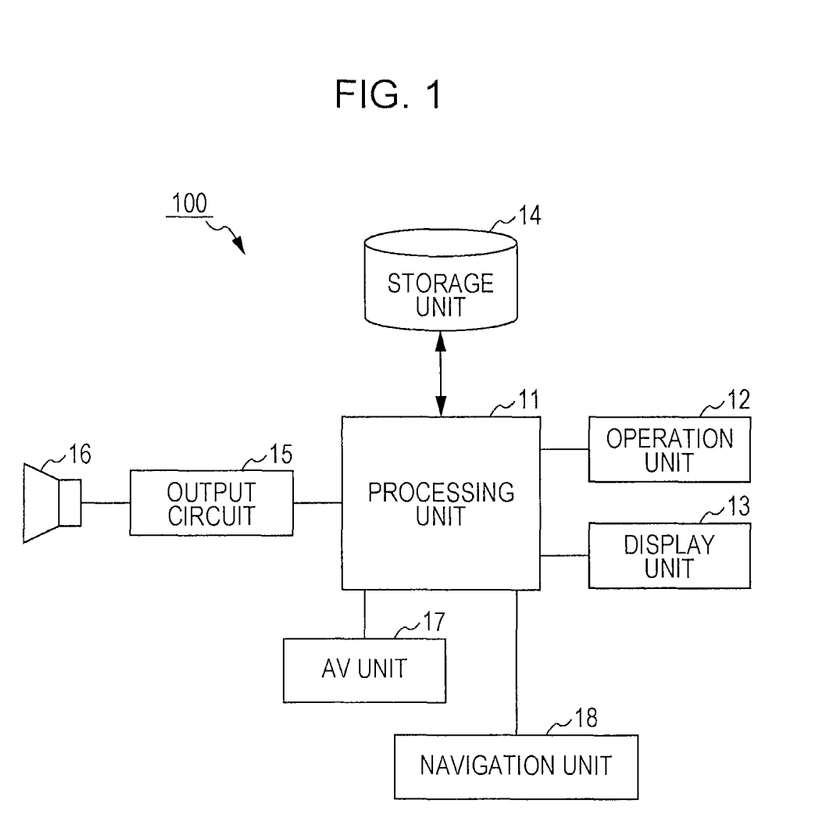
FIG. 1 is a block diagram illustrating an exemplary configuration of an in-vehicle navigation apparatus according to an embodiment of the present invention.

FIG. 1 is a block diagram illustrating an exemplary configuration of an in-vehicle navigation apparatus according to an embodiment of the present invention.

Referring to FIG. 1, an in-vehicle navigation apparatus 100 includes a processing unit 11 composed of a computer unit (for example, including a central processing unit (CPU)). An audio-visual (AV) unit 17 and a navigation unit 18 are connected to the processing unit 11. The AV unit 17 is capable of playing back various audio sources and video sources (for example, compact discs (CDs) or digital versatile disks (DVD)). The navigation unit 18 performs navigation processing including route guidance for the user's vehicle. An output circuit 15 to which a speaker 16 is connected is also connected to the processing unit 11. An audio signal based on the processing in the AV unit 17 and the navigation unit 18 is supplied to the speaker 16 via the output circuit 15 under the control of the processing unit 11, and a sound based on the audio signal is output from the speaker 16. A storage unit 14 (for example, a hard disk), a display unit 13, and an operation unit 12 are also connected to the processing unit 11. The storage unit 14 stores a variety of information, such as music information and map information, used in the AV unit 17 and the navigation unit 18. The display unit 13 is, for example, a liquid crystal display (LCD) and displays a variety of information including video. The operation unit 12 includes, for example, a touch panel and operation buttons on the display unit 13 and is used to input a processing instruction and a variety of information.

The map information stored in the storage unit 14 includes map data used in the display of a map, map data used in route guidance, and so on. Information about multiple lanes (information about the right-turn lane, the through lane, or the number of lanes or the like), which is provided for every intersection, is included in the map data used in route guidance. In addition to the lane information at each intersection, lane information about a lane end point where the width of the driving lanes is reduced, for example, at a point where the number of driving lanes is decreased from three to two, is also stored in the map data. Furthermore, information about main buildings, facilities, and so on (for example, convenience stores, banks, and gas stations), which serve as landmarks in the driving, is also stored in the map data.

Figure 2A:
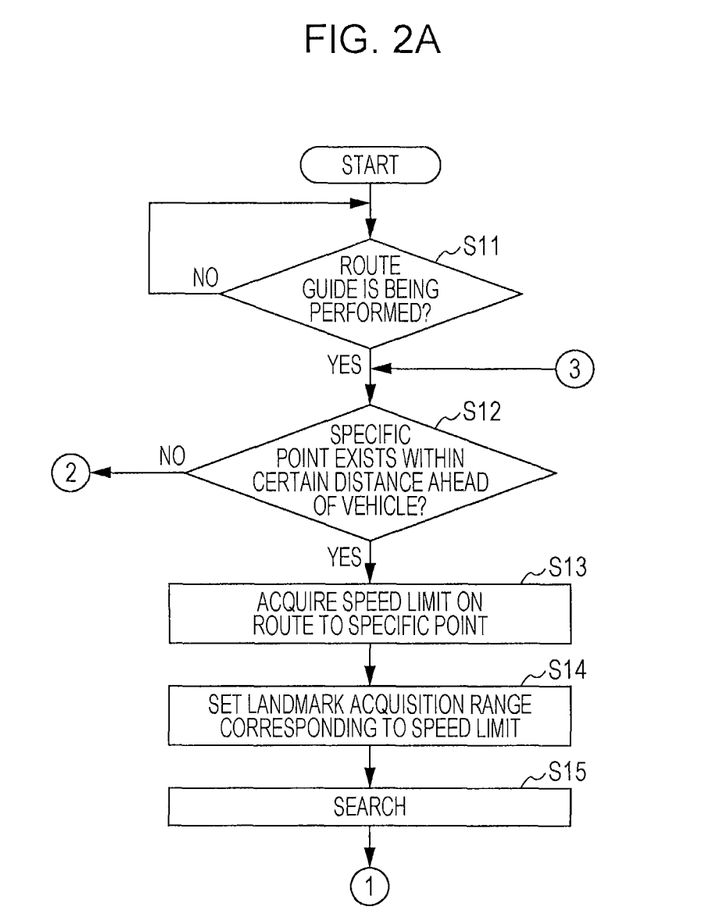
FIG. 2A is a flowchart illustrating an exemplary process of controlling display of a recommended driving lane, which is performed by a processing unit illustrated in FIG. 1.
Figure 2B:
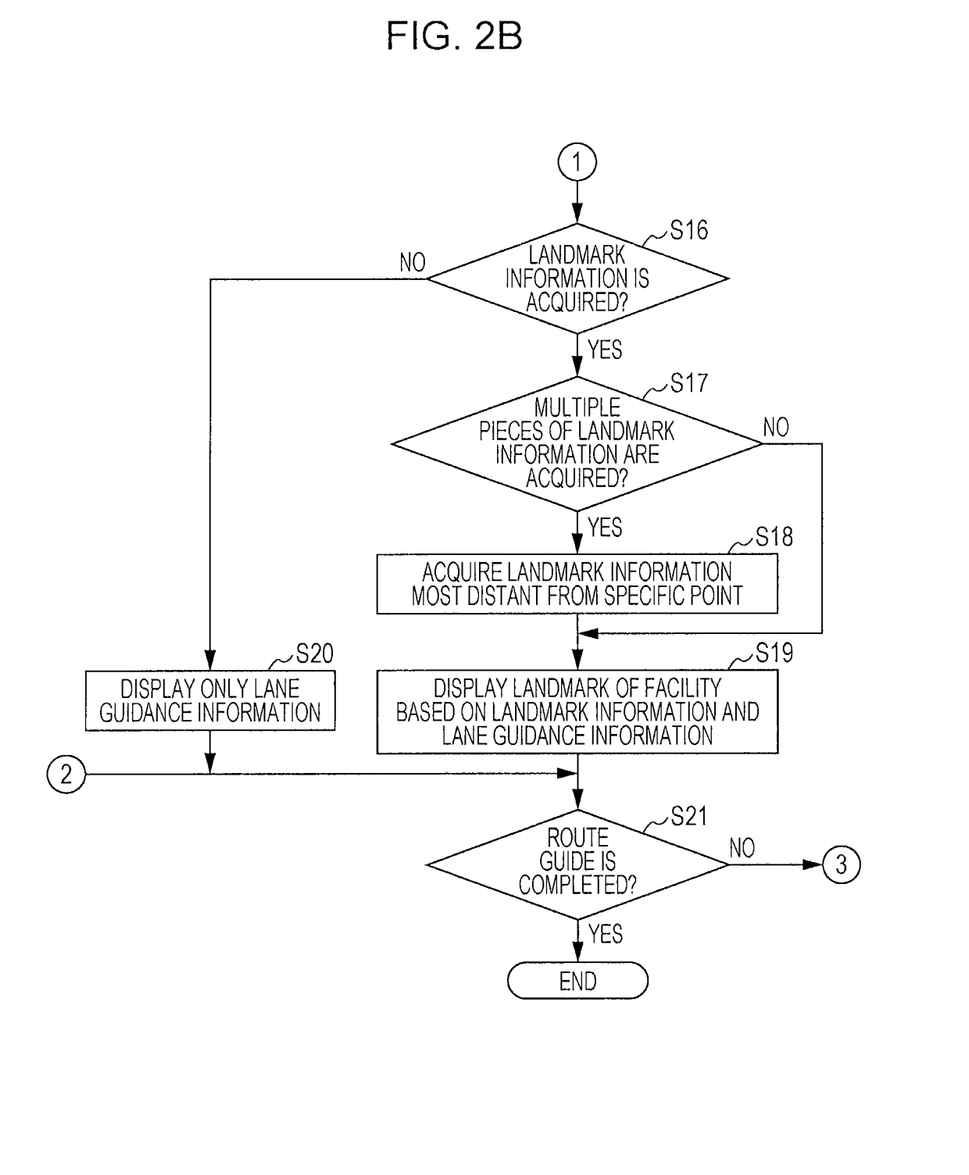
FIG. 2B is a flowchart illustrating the exemplary process of controlling display of a recommended driving lane, which is performed by the processing unit illustrated in FIG. 1.

FIG. 2A and FIG. 2B illustrate an exemplary process of controlling the display of a recommended driving lane on the display unit 13 during route guidance of the user's vehicle, which is performed by the processing unit 11.

Referring to FIG. 2A and FIG. 2B, a destination is set in response to an operation by a user with the operation unit 12 and a route to the destination is set on the basis of the map information and so on used in the route guidance, which is stored in the navigation unit 18 and the storage unit 14. In Step S11 in FIG. 2A, the processing unit 11 determines whether route guidance is being performed. If route guidance to the destination is being performed (YES in Step S11), in Step S12 the processing unit 11 determines whether a specific point exists within a certain distance ahead of the user's vehicle. Specifically, the processing unit 11 determines whether the user's vehicle approaches a certain point on the near side of the specific point where the lane on which the user's vehicle should travel is restricted (for example, whether the user's vehicle approaches a point on the route within a radius of 400 m from the position of the user's vehicle) on the basis of the lane information stored in the storage unit 14 and the route set by the navigation unit 18.

Figure 3:
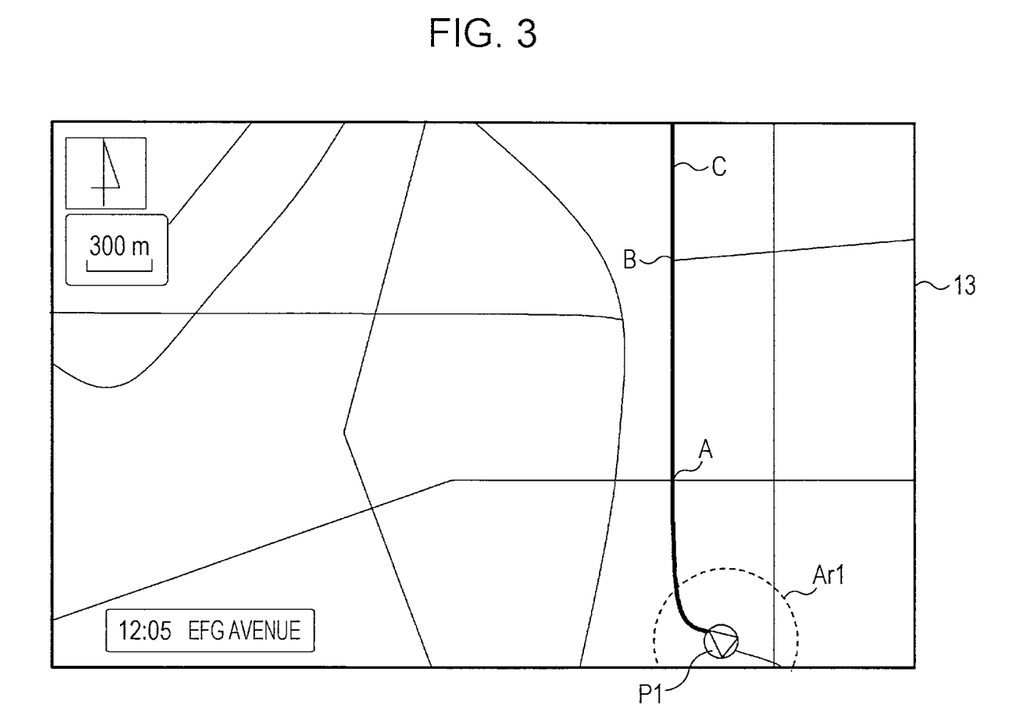
FIG. 3 illustrates a first example in which a route guidance screen is displayed on a display unit illustrated in FIG. 1.

If a point where the lane on which the user's vehicle should travel is restricted (hereinafter referred to as the specific point) does not exist within a certain distance Ar1 on the route from the vehicle position P1, for example, as in an example illustrated in FIG. 3 (NO in Step S12), in Step S21 the processing unit 11 determines whether route guidance is completed. The processing unit 11 continues the normal route guidance on the display unit 13 while confirming whether route guidance is completed in Step S21 until the user's vehicle travels on the route and the specific point appears within the certain distance Ar1 on the route (NO in Step S12 and NO in Step S21).

If the user's vehicle continues to travel and the processing unit 11 determines that the specific point (for example, an intersection A) exists within the certain distance ahead of the user's vehicle (YES in Step S12), in Step S13 the processing unit 11 acquires a speed limit on the route to the specific point (the intersection A). After the speed limit (for example, 60 km/h) set on the route to the specific point (the intersection A) is acquired on the basis of the lane information stored in the storage unit 14, in Step S14 the processing unit 11 sets a landmark acquisition range corresponding to the acquired speed limit.

Figure 4:
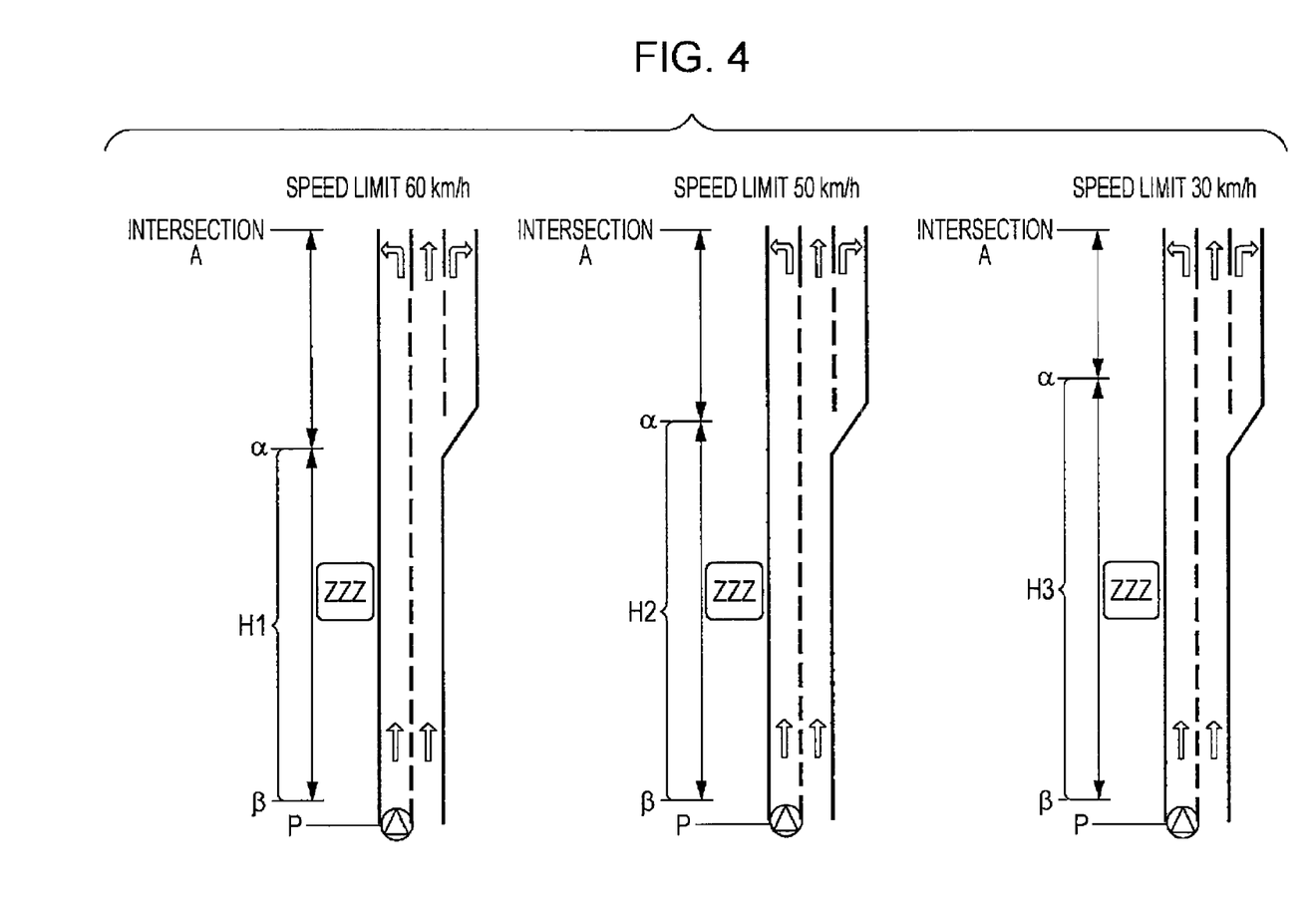
FIG. 4 illustrates a second example in which the route guidance screen is displayed on the display unit illustrated in FIG. 1.

How to set the landmark acquisition range corresponding to the speed limit in Step S14 will now be described in detail with reference to FIG. 4. Referring to FIG. 4, landmark acquisition ranges H1, H2, and H3 are set between a certain point β on the near side of the specific point (the intersection A) and a point α toward the specific point. The certain point β on the near side of the specific point is set a certain distance short of the specific point (for example, a point 300 m short of the specific point). In contrast, the point α is set so as to be spaced from the specific point in accordance with the increasing speed limit on the route. In other words, since the certain point β is set at a point α certain distance short of the specific point, the landmark acquisition range is narrowed with an increasing speed limit.

Specifically, when the speed limit is 60 km/h, the point α is set at a point 90 m short of the specific point (the intersection A), and the landmark acquisition range H1 is a range between the point 300 m short of the specific point (the intersection A) and the point 90 m short of the specific point (the intersection A). When the speed limit is 50 km/h, the point α is set at a point 70 m short of the specific point (the intersection A), and the landmark acquisition range H2 is a range between the point 300 m short of the specific point (the intersection A) and the point 70 m short of the specific point (the intersection A). When the speed limit is 30 km/h, the point α is set at a point 40 m short of the specific point (the intersection A), and the landmark acquisition range H3 is a range between the point 300 m short of the specific point (the intersection A) and the point 40 m short of the specific point (the intersection A).

Referring back to FIG. 2A, in Step S15, the processing unit 11 searches for an object (for example, a facility) existing along the route within the landmark acquisition range set in Step S14 to acquire landmark information (for example, the name of the facility and a mark representing the facility) representing the object resulting from the search (a landmark information acquiring unit and a landmark search unit). Referring to FIG. 2B, in Step S16 the processing unit 11 determines whether the landmark information is acquired by the search. If the landmark information is acquired by the search (YES in Step S16), in Step S17 the processing unit 11 determines whether landmark information representing multiple objects is acquired, that is, whether multiple pieces of landmark information are acquired. If multiple pieces of landmark information are acquired (YES in Step S17), in Step S18 the processing unit 11 acquires landmark information about the landmark most distant from the specific point (the intersection A) (the landmark information acquiring unit).

Figure 5:
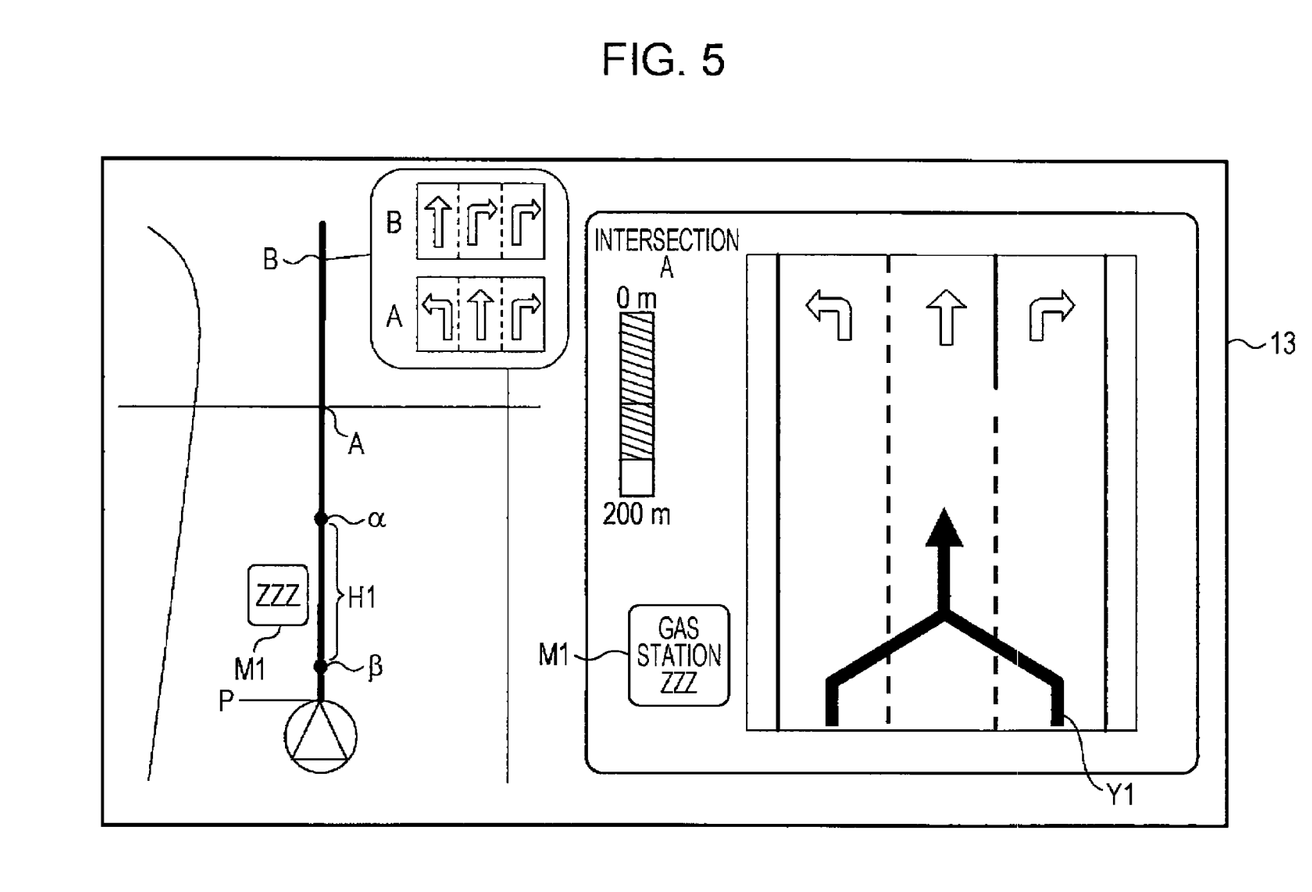
FIG. 5 illustrates a third example in which the route guide screen is displayed in the display unit illustrated in FIG. 1.

In Step S19, the processing unit 11 displays a landmark of the facility based on the landmark information acquired in Step S18 and lane guidance information on the display unit 13, for example, in a manner illustrated in FIG. 5 (a lane guide unit). As illustrated in the example in FIG. 5, the processing unit 11 displays a mark M1 corresponding to an object (for example, a gas station ZZZ) represented by the landmark information (the name of the facility and the mark representing the facility) acquired in Step S18 on a map including the route displayed on the display unit 13. In addition, the processing unit 11 displays lane guidance information Y1 leading the user's vehicle to the lane on which the user's vehicle should run in association with the mark M1 representing the gas station ZZZ on the display unit 13 so that the lane guidance information Y1 is associated with the mark M1 (a lane guidance display control unit). Specifically, the processing unit 11 displays the mark M1 representing the object (the gas station ZZZ) represented by the landmark information on a route guidance map (at the left side of the display unit 13) and a driving lane enlarged screen (at the right side of the display unit 13) (a landmark display control unit).

The processing unit 11 displays the lane guidance information Y1 displayed on the driving lane enlarged screen displayed at the right side of the display unit 13 so as to be associated with the mark M1 on the display unit 13 (the lane guidance display control unit). In addition to the display of the lane guidance information Y1 on the display unit 13, the processing unit 11 outputs audio guidance for lane guidance via the output circuit 15 and the speaker 16 (the lane guide unit). The audio guide output from the speaker 16 is, for example, guidance to travel in a specific lane by using the building (the gas station ZZZ) represented by the landmark information as a trigger. More specifically, the processing unit 11 causes the speaker 16 to output the audio guide, for example, "Drive in the middle lane beyond the gas station ZZZ." Then, the process continues to the next step.

Figure 6:
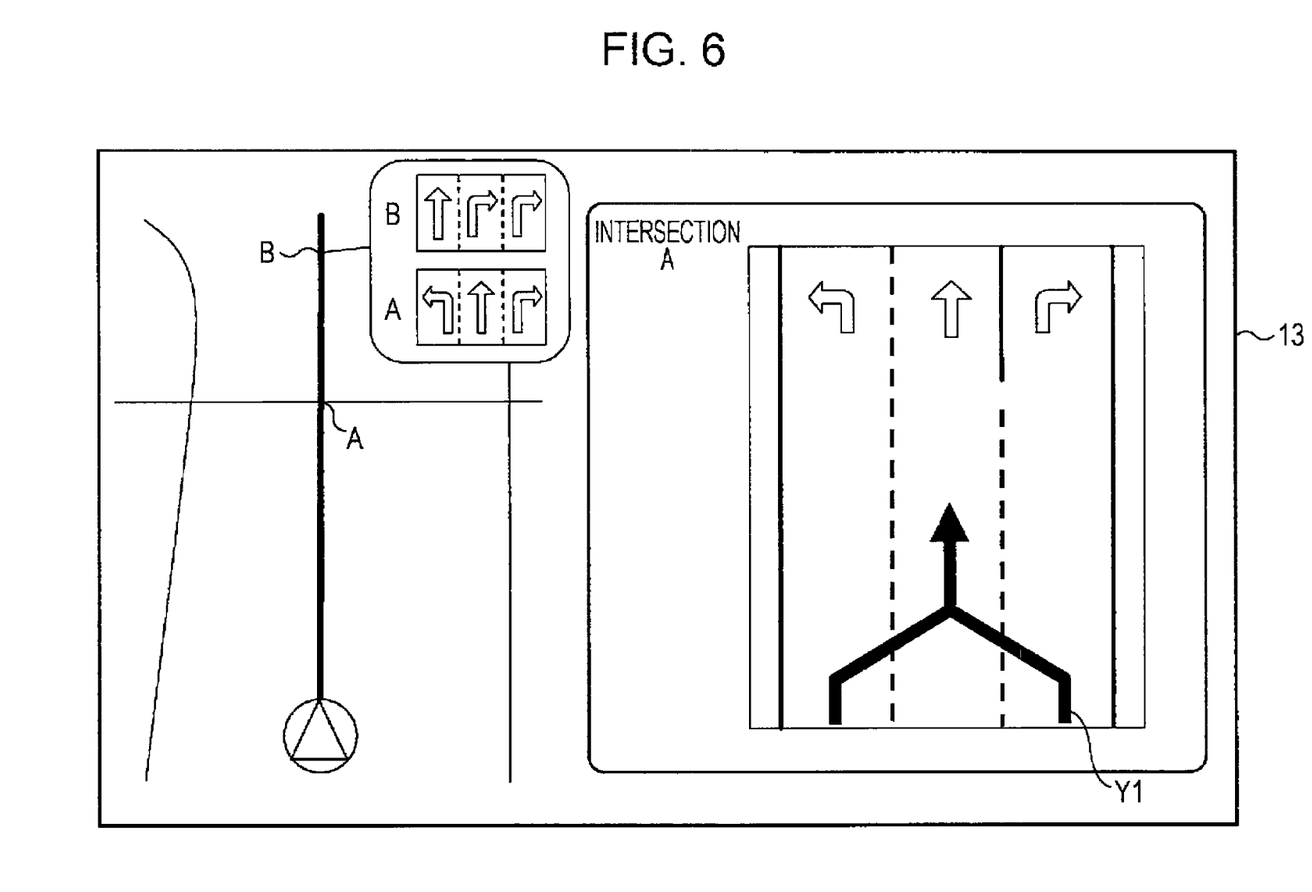
FIG. 6 illustrates a fourth example in which the route guidance screen is displayed on the display unit illustrated in FIG. 1.

If the processing unit 11 determines that landmark information is not acquired by the search (NO in Step S16), in Step S20 the processing unit 11 displays only the lane guidance information Y1 on the display unit 13. Specifically, the processing unit 11 displays only the lane guidance information Y1 leading the user's vehicle to the specific lane on the driving lane enlarged screen on the display unit 13 in a manner illustrated in FIG. 6. Then, the process continues to the next step.

In Step S21, the processing unit 11 determines whether route guidance is completed. If the processing unit 11 determines that route guidance is not completed (NO in Step S21), the processing unit 11 continues normal route guidance on the display unit 13 while confirming whether route guidance is completed in Step S21 until the specific point appears within the certain distance Ar1 on the route set from the user's vehicle position P1 (NO in Step S12 and NO in Step S21).

If the user's vehicle continues to travel and the processing unit 11 determines that the specific point (for example, an intersection B) exists within the certain distance ahead of the user's vehicle (YES in Step S12), in Step S13 the processing unit 11 acquires a speed limit on the route to the specific point (the intersection B). After the speed limit (for example, 50 km/h) set on the route to the specific point (the intersection B) is acquired on the basis of the lane information stored in the storage unit 14, in Step S14 the processing unit 11 sets the landmark acquisition range H2 (for example, a range from the point 300 m short of the specific point (the intersection B) to the point 70 m short of the specific point (the intersection B)) corresponding to the acquired speed limit.

In Step S15, the processing unit 11 searches for an object (for example, a facility) existing along the route within the landmark acquisition range set in Step S14 to acquire the landmark information (for example, the name of the facility and a mark representing the facility) representing the object resulting from the search. Referring to FIG. 2B, in Step S16 the processing unit 11 determines whether landmark information is acquired by the search. If landmark information is acquired by the search (YES in Step S16), in Step S17 the processing unit 11 determines whether landmark information representing multiple objects is acquired, that is, whether multiple pieces of landmark information are acquired. If multiple pieces of landmark information are not acquired (NO in Step S17), in Step S19 the processing unit 11 displays a landmark of the facility based on the landmark information acquired in Step S16 and the lane guidance information on the display unit 13, for example, in a manner illustrated in FIG. 7.

Figure 7:
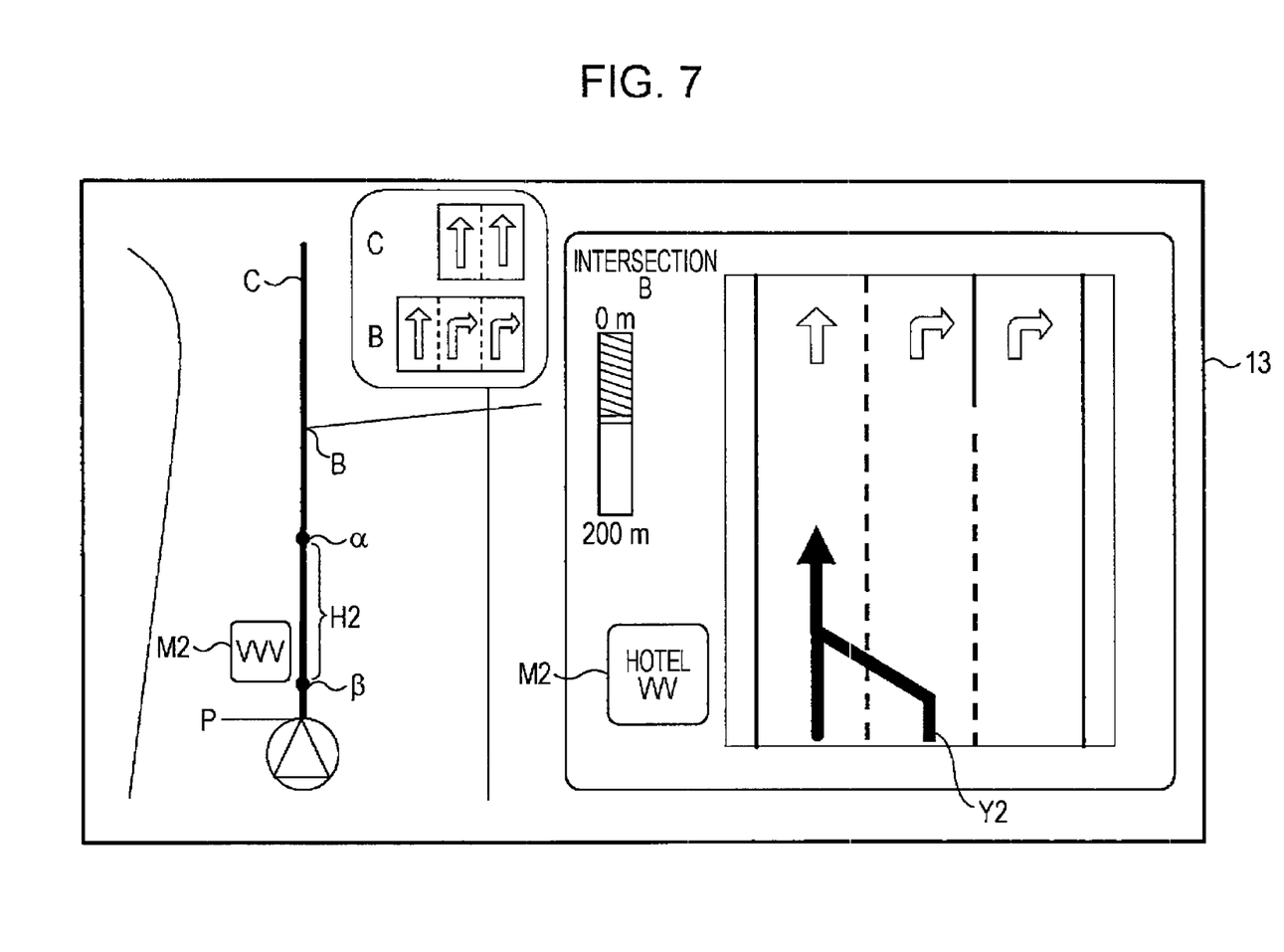
FIG. 7 illustrates a fifth example in which the route guidance screen is displayed on the display unit illustrated in FIG. 1.

As illustrated in the example in FIG. 7, the processing unit 11 displays a mark M2 corresponding to an object (for example, a hotel VVV) represented by the landmark information (the name of the facility and the mark representing the facility) acquired in Step S16 on the map including the route displayed on the display unit 13. In addition, the processing unit 11 displays lane guidance information Y2 leading the user's vehicle to the lane on which the vehicle should travel in association with the mark M2 representing the hotel VVV on the display unit 13 so that the lane guidance information Y2 is associated with the mark M2. Specifically, the processing unit 11 displays the mark M2 representing the object (the hotel VVV) represented by the landmark information on the route guidance map (at the left side of the display unit 13) and the driving lane enlarged screen (at the right side of the display unit 13).

The processing unit 11 displays the lane guidance information Y2 displayed on the driving lane enlarged screen displayed at the right side of the display unit 13 so as to be associated with the mark M2 on the display unit 13. In addition to the display of the lane guidance information Y2 on the display unit 13, the processing unit 11 outputs audio guidance for the lane guidance via the output circuit 15 and the speaker 16. The audio guidance output from the speaker 16 is, for example, guidance to travel on a specific lane by using the building (the hotel VVV) represented by the landmark information as a trigger. More specifically, the processing unit 11 causes the speaker 16 to output the audio guidance, for example, "Drive in the left-side lane beyond the hotel VVV." Then, the process continues to the next step.

In Step S21, the processing unit 11 determines whether route guidance is completed. If the processing unit 11 determines that route guidance is not completed (NO in Step S21), the processing unit 11 continues normal route guidance on the display unit 13 while confirming whether route guidance is completed in Step S21 until the specific point appears within the certain distance Ar1 on the route set from the user's vehicle position P1 (NO in Step S12 and NO in Step S21).

If the user's vehicle continues to travel and the processing unit 11 determines that the specific point (for example, a lane end point C) exists within the certain distance ahead of the user's vehicle (YES in Step S12), in Step S13 the processing unit 11 acquires a speed limit on the route to the specific point (the lane end point C). After the speed limit (for example, 30 km/h) set on the route to the specific point (the lane end point C at which the driving lane is restricted because of a reduction in the width of the road) is acquired on the basis of the lane information stored in the storage unit 14, in Step S14 the processing unit 11 sets the landmark acquisition range H3 (for example, a range from the point 300 m short of the specific point (the lane end point C) to the point 40 m short of the specific point (the lane end point C)) corresponding to the acquired speed limit.

In Step S15, the processing unit 11 searches for an object existing along the route within the landmark acquisition range set in Step S14 to acquire landmark information representing the object resulting from the search. Referring to FIG. 2B, in Step S16 the processing unit 11 determines whether landmark information is acquired by the search. If landmark information is acquired by the search (YES in Step S16), in Step S17 the processing unit 11 determines whether multiple pieces of landmark information are acquired. If multiple pieces of landmark information are not acquired (NO in Step S17), in Step S19 the processing unit 11 displays a landmark of the facility based on the landmark information acquired in Step S16 and the lane guidance information on the display unit 13, for example, in a manner illustrated in FIG. 8.

Figure 8:
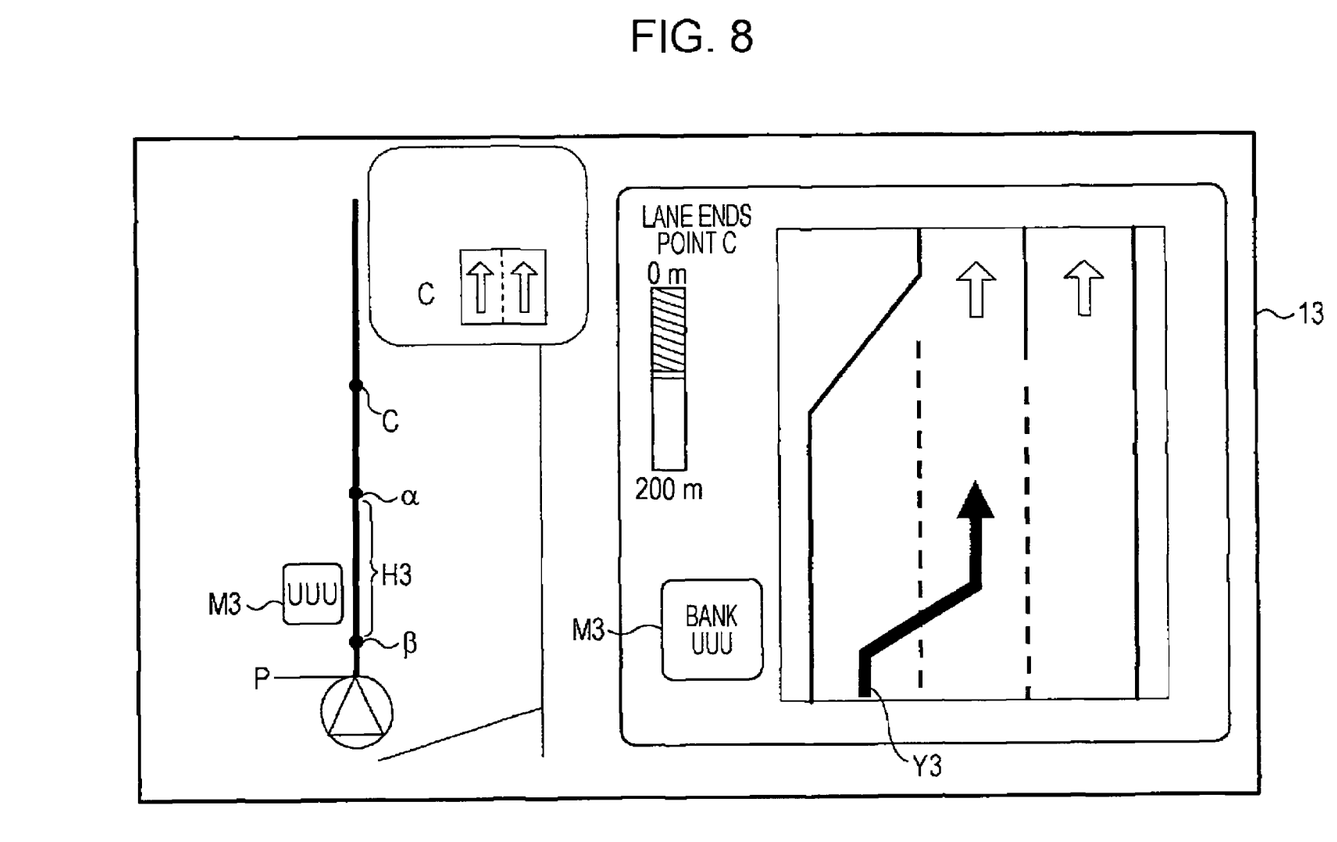
FIG. 8 illustrates a sixth example in which the route guidance screen is displayed on the display unit illustrated in FIG. 1.

As illustrated in the example in FIG. 8, the processing unit 11 displays a mark M3 corresponding to an object (for example, a bank UUU) represented by the landmark information (the name of the facility and the mark representing the facility) acquired in Step S16 on the map including the route displayed on the display unit 13. In addition, the processing unit 11 displays lane guidance information Y3 leading the user's vehicle to the lane on which the user's vehicle should travel in association with the mark M3 representing the bank UUU in the display unit 13 so that the lane guidance information Y3 is associated with the mark M3. Specifically, the processing unit 11 displays the mark M3 representing the object (the bank UUU) represented by the landmark information on the route guidance map (at the left side of the display unit 13) and the driving lane enlarged screen (at the right side of the display unit 13).

The processing unit 11 displays the lane guidance information Y3 displayed on the driving lane enlarged screen displayed at the right side of the display unit 13 so as to be associated with the mark M3 on the display unit 13. In addition to the display of the lane guidance information Y3 on the display unit 13, the processing unit 11 outputs audio guidance for the lane guidance via the output circuit 15 and the speaker 16. The audio guidance output from the speaker 16 is, for example, guidance to travel in a specific lane by using the building (the bank UUU) represented by the landmark information as a trigger. More specifically, the processing unit 11 causes the speaker 16 to output the audio guidance, for example, "Drive in the middle lane beyond the bank UUU." Then, the process continues to the next step.

In Step S21, the processing unit 11 determines whether route guidance is completed. If the processing unit 11 determines that route guidance is completed (YES in Step S21), the process of controlling the display of a recommended driving lane on the display unit 13 during the route guidance of the user's vehicle is terminated.

As described above, in the in-vehicle navigation apparatus 100 according to the embodiment of the present invention, if route guidance to the destination is being performed (YES in Step S11) and the specific point (the intersection A) exists within the certain distance (for example, 400 m) ahead of the user's vehicle (YES in Step S12), the processing unit 11 detects the speed limit on the route to the specific point (the intersection A) (Step S13). The processing unit 11 sets the landmark acquisition range corresponding to the detected speed limit (for example, 60 km/h) (Step S14) and searches for a building (the gas station ZZZ), which is a landmark within the landmark acquisition range that is set (Step S15). The processing unit 11 acquires the landmark information resulting from the search and displays the mark M1 corresponding to the object (for example, the gas station ZZZ) represented by the acquired landmark information and the lane guidance information Y1 leading the user's vehicle to the lane on which the vehicle should travel in association with the mark M1 on the display unit 13 so that the lane guidance information Y1 is associated with the mark M1 (Step S19). Accordingly, a driver receiving the guidance is capable of performing a driving operation to change the lane on which the user's vehicle is traveling to the guided lane by using the confirmation of the object existing along the route as a trigger when the user's vehicle is traveling to the specific point.

In the in-vehicle navigation apparatus 100, if multiple pieces of landmark information are acquired (YES in Step S16 and YES in Step S17), the processing unit 11 acquires the landmark information about the building which is the landmark most distant from the specific point (the intersection A) (Step S18) and displays the mark M1 corresponding to the object (for example, the gas station ZZZ) represented by the acquired landmark information and the lane guidance information Y1 leading the user's vehicle to the lane on which the vehicle should travel in association with the mark M1 on the display unit 13 so that the lane guidance information Y1 is associated with the mark M1 (Step S19). Accordingly, a driver receiving the guidance is capable of performing the driving operation to change to the guided lane in plenty of time by using the confirmation of the object existing along the route as a trigger when the user's vehicle is traveling to the specific point.

Although the point α is set to the point 90 m short of the specific point (the intersection A) and the landmark acquisition range H1 is a range between the point 300 m short of the specific point (the intersection A) and the point 90 m short of the specific point (the intersection A) when the speed limit is 60 km/h, the landmark acquisition range H1 is not limited to the above range. The landmark acquisition range H1 may be arbitrarily set between the specific point and the certain point.

The processing unit 11 in the in-vehicle navigation apparatus 100 outputs audio guidance for the lane guidance via the output circuit 15 and the speaker 16, in addition to the display of the lane guidance information Y1 on the display unit 13. Accordingly, a driver receiving the audio guidance is capable of performing the driving operation to change the lane on which the users's vehicle is traveling to the guided specific lane by using the confirmation of the object (for example, the gas station ZZZ) existing along the route as a trigger.

Although the speed limit set on the route to the specific point is acquired on the basis of the lane information stored in the storage unit 14 in Step S13, the processing in Step S13 is not limited to this. For example, the driving speed of the user's vehicle at the certain point on the near side of the specific point may be detected. In this case, the lane on which the user's vehicle should travel is guided in association with an object existing along the route within the landmark acquisition range, which is set so as to be spaced apart from the specific point with increasing driving speed of the user's vehicle. Accordingly, a driver receiving the guidance is capable of appropriately performing the driving operation to change to the guided lane by using the confirmation of the object existing along the route as a trigger even if the driving speed of the user's vehicle is increased when the vehicle is traveling to the specific point.

Although the landmark information about the landmark most distant from the specific point is acquired in Step S18, the processing in Step S18 is not limited to this. The landmark information about the landmark closest to the specific point may be acquired in Step S18. This allows the ratio in which the lane on which the user's vehicle should travel is restricted on the route to be reduced.

Although the audio guidance for the lane guidance, which is output along with the display of the lane guidance information on the display unit 13, is guidance to travel on a specific lane by using the building (the gas station ZZZ) represented by the landmark information as a trigger in Step S19, the guidance to run on a specific lane may be made after the user's vehicle passes the building (the gas station ZZZ) represented by the landmark information. More specifically, the processing unit 11 may cause the speaker 16 to output the audio guidance, for example, "Drive in the middle lane after passing the gas station ZZZ."

As described above, the in-vehicle navigation apparatus according to an embodiment of the present invention has the advantage that the in-vehicle navigation apparatus is capable of guiding the user to the lane on which the user's vehicle should travel so that the user can easily understand a time when the user's vehicle changes to the lane in which the vehicle should travel when the user's vehicle is traveling on the route that is set. The in-vehicle navigation apparatus according to the above embodiment of the present invention is useful for providing guidance to the lane in which the user's vehicle should travel on the route in the guidance of the route on which the vehicle should travel.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An in-vehicle navigation apparatus that provides guidance to a lane on which a user's vehicle should travel among a plurality of driving lanes on a guidance route, the in-vehicle navigation apparatus comprising:
   a navigation unit connected to a processor, further comprising
   a landmark information acquiring unit configured to acquire landmark information representing an object which serves as a landmark existing along the route within a landmark acquisition range, the landmark acquisition range defining a distance range spaced apart along the route from a specific point on a near side of the specific point between a point β set a certain distance short of the specific point and a point α spaced apart from the point β toward the specific point but spaced apart from the specific point, a lane among the plurality of driving lanes on the route on which the user's vehicle should travel being restricted at the specific point; and
   a lane guide unit configured to provide guidance, from a display by a display unit and/or an audio guide by a speaker, to the lane on which the user's vehicle should travel in association with the object represented by the landmark information acquired by the landmark information acquiring unit;
   wherein the lane guide unit includes
   a landmark display control unit that displays a mark corresponding to the object represented by the landmark information on a map that includes the guidance route and that is displayed on the display unit; and
   a lane guidance display control unit that displays lane guidance information leading the user's vehicle to the specific lane on which the user's vehicle should travel in association with the mark displayed on the display unit; and
   wherein the landmark acquisition range is set so as to be spaced apart from the specific point a greater distance with one of an increasing speed limit on the route to the specific point and increasing driving speed of the user's vehicle at a certain point on the near side of the specific point.

2. The in-vehicle navigation apparatus according to claim 1,
   wherein the landmark information acquiring unit includes a landmark search unit that searches for an object existing along the route within the landmark acquisition range, and
   wherein the landmark information acquiring unit acquires the landmark information representing the object resulting from the search by the landmark search unit.

3. The in-vehicle navigation apparatus according to claim 1,
   wherein, when landmark information representing multiple objects is acquired by the search by the landmark search unit, the landmark information acquiring unit acquires the landmark information representing any of the multiple objects.

4. The in-vehicle navigation apparatus according to claim 3,
 wherein the landmark information acquiring unit acquires landmark information representing an object most distant from the specific point, among the multiple objects.

5. The in-vehicle navigation apparatus according to claim 2,
 wherein the lane guide unit provides guidance to travel on a specific lane by referring to the object represented by the landmark information acquired by the landmark information acquiring unit.

6. The in-vehicle navigation apparatus according to claim 5,
 wherein the lane guide unit provides guidance that the user should travel on the specific lane after the user's vehicle passes the object represented by the landmark information.

7. A method of operating an in-vehicle navigation apparatus that provides guidance to a lane on which a user's vehicle should travel among a plurality of driving lanes on a guidance route, the navigation apparatus comprising a navigation unit connected to a processor and the method comprising:
 acquiring landmark information representing an object which serves as a landmark existing along the route within a landmark acquisition range, the landmark acquisition range defining a distance range spaced apart along the route from a specific point on a near side of the specific point between a point β set a certain distance short of the specific point and a point α spaced apart from the point β toward the specific point but spaced apart from the specific point, a lane among the plurality of driving lanes on the route on which the user's vehicle should travel being restricted at the specific point; and
 providing guidance to the lane on which the user's vehicle should travel in association with the object represented by the acquired landmark information, where guidance is provided from a display by a display unit and/or an audio guide by a speaker;
 wherein the act of providing guidance includes
 displaying a mark corresponding to the object represented by the landmark information on a map that includes the guidance route and that is displayed on the display unit; and
 displaying lane guidance information leading the user's vehicle to the specific lane on which the user's vehicle should travel in association with the mark displayed on the display unit;
 wherein the landmark acquisition range is set so as to be spaced apart from the specific point a greater distance with one of an increasing speed limit on the route to the specific point and increasing driving speed of the user's vehicle at a certain point on the near side of the specific point.

8. The method according to claim 7,
 wherein acquiring the landmark information includes searching for an object existing along the route within the landmark acquisition range, and
 acquiring the landmark information representing the object resulting from the search.

9. The method according to claim 7,
 wherein, when landmark information representing multiple objects is acquired, the landmark information representing any of the multiple objects is acquired.

10. The method according to claim 9,
 wherein landmark information representing an object most distant from the specific point is acquired, among the multiple objects.

11. The method according to claim 8,
 wherein guidance is provided to travel on a specific lane by referring to the object represented by the acquired landmark information.

12. The method according to claim 11,
 wherein guidance is provided that the user should travel on the specific lane after the user's vehicle passes the object represented by the landmark information.

\* \* \* \* \*